United States Patent
Hunt et al.

(10) Patent No.: US 9,413,456 B2
(45) Date of Patent: Aug. 9, 2016

(54) NON-LINEAR OPTICAL RECEIVER

(75) Inventors: Jeffrey H. Hunt, Thousand Oaks, CA (US); Nicholas Koumvakalis, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 64 days.

(21) Appl. No.: 13/554,871

(22) Filed: Jul. 20, 2012

(65) Prior Publication Data
US 2014/0023381 A1 Jan. 23, 2014

(51) Int. Cl.
| | | |
|---|---|---|
| H04B 10/24 | (2006.01) |
| H04J 14/00 | (2006.01) |
| H04J 14/02 | (2006.01) |
| H04B 10/00 | (2013.01) |
| H04B 10/12 | (2006.01) |
| H04B 10/112 | (2013.01) |

(52) U.S. Cl.
CPC .................................. H04B 10/112 (2013.01)

(58) Field of Classification Search
CPC .......... H04B 10/1125; H04B 10/1127; H04B 10/114; H04B 10/2504; H04B 10/2507; H04B 10/25077; H04B 10/2519; H04B 10/6151; H04B 10/6164; H04B 10/6165; H04B 10/06; H04B 10/08; H04B 10/04; H04B 10/00; H04J 14/02
USPC ............... 398/42, 85–86, 68, 69, 79, 91, 118, 398/119, 149, 205, 208, 130
See application file for complete search history.

(56) References Cited

U.S. PATENT DOCUMENTS

| | | | | |
|---|---|---|---|---|
| 5,341,236 | A * | 8/1994 | Stappaerts | G02F 1/37 359/326 |
| 6,222,879 | B1 * | 4/2001 | Cideciyan | H04L 25/03038 375/233 |
| 6,243,178 | B1 * | 6/2001 | Suemura | H04Q 11/0005 398/56 |
| 6,501,578 | B1 * | 12/2002 | Bernstein | H04B 10/1121 398/130 |
| 6,836,574 | B2 * | 12/2004 | Shioda | H04B 10/5051 385/1 |
| 7,330,300 | B1 * | 2/2008 | Yu | G02F 1/3534 359/326 |
| 8,054,212 | B1 | 11/2011 | Holly et al. | |
| 8,058,940 | B1 * | 11/2011 | Quevy | H03B 21/01 310/321 |
| 8,064,544 | B2 * | 11/2011 | Li | H04B 10/677 375/283 |
| 8,531,761 | B2 * | 9/2013 | Chann | H01S 3/0057 359/333 |

(Continued)

OTHER PUBLICATIONS

Breed, Gary, The Mathematics of Mixers: Basic Principles, Jan. 2011, Summit Technical Media, LLC.*

(Continued)

*Primary Examiner* — David Payne
*Assistant Examiner* — Pranesh Barua
(74) *Attorney, Agent, or Firm* — Yee & Associates, P.C.

(57) ABSTRACT

A method and apparatus for optical communication. A plurality of optical signals having a plurality of different frequencies is received at a receiver. The plurality of optical signals received at the receiver is sent through a non-linear optical element in the receiver such that a resulting optical signal is generated that has a frequency based on at least one of the plurality of different frequencies. Information is identified in the resulting optical signal.

20 Claims, 7 Drawing Sheets

(56) References Cited

U.S. PATENT DOCUMENTS

| | | | | |
|---|---|---|---|---|
| 2002/0171896 A1* | 11/2002 | Clark | H04B 10/1127 | 398/121 |
| 2003/0084837 A1* | 5/2003 | Lee | G02F 1/3558 | 117/2 |
| 2004/0033072 A1* | 2/2004 | Kaneko | G01J 3/1804 | 398/34 |
| 2004/0095633 A1* | 5/2004 | Nee | G02F 2/004 | 359/326 |
| 2005/0013543 A1* | 1/2005 | Ionov | H04B 10/508 | 385/39 |
| 2005/0025482 A1* | 2/2005 | Richards | H04B 10/2569 | 398/65 |
| 2006/0210276 A1* | 9/2006 | Korn | H04B 10/0795 | 398/85 |
| 2008/0002753 A1* | 1/2008 | Timans | G01K 11/125 | 374/2 |
| 2008/0075464 A1* | 3/2008 | Maleki | G02B 6/29341 | 398/85 |
| 2008/0152360 A1* | 6/2008 | Bennett | G01J 11/00 | 398/204 |
| 2008/0205905 A1* | 8/2008 | Tao | H04B 10/61 | 398/204 |
| 2009/0040093 A1* | 2/2009 | Holly | G01S 13/04 | 342/22 |
| 2010/0183294 A1* | 7/2010 | Villarruel | H04B 10/032 | 398/10 |
| 2010/0187208 A1* | 7/2010 | Dantus | G01J 11/00 | 219/121.72 |
| 2011/0038642 A1* | 2/2011 | Mahlab | H04B 10/671 | 398/211 |
| 2011/0097089 A1* | 4/2011 | Hunt | H04B 10/1125 | 398/115 |
| 2011/0102243 A1* | 5/2011 | Sai | G01S 13/0209 | 342/124 |
| 2011/0103801 A1* | 5/2011 | Breunig | H04B 10/2575 | 398/118 |
| 2011/0167314 A1* | 7/2011 | Gerstel | H03M 13/353 | 714/752 |
| 2011/0182589 A1* | 7/2011 | Kotake | H04B 10/532 | 398/152 |
| 2012/0057627 A1* | 3/2012 | Chan | H04L 25/03057 | 375/233 |
| 2012/0072802 A1* | 3/2012 | Chinnici | H04L 1/0003 | 714/758 |
| 2012/0155575 A1* | 6/2012 | Laporte | H04B 1/0014 | 375/340 |
| 2013/0029626 A1* | 1/2013 | Chen | H04B 15/04 | 455/334 |
| 2013/0058649 A1* | 3/2013 | Li | H04B 10/2572 | 398/43 |
| 2013/0126701 A1* | 5/2013 | Smith | H03F 3/08 | 250/206 |
| 2013/0321800 A1* | 12/2013 | Margalit | G01J 3/44 | 356/301 |

OTHER PUBLICATIONS

U.S. Appl. No. 13/554,871, Hunt et al., Pranesh Barua.*

\* cited by examiner

NON-LINEAR OPTICAL RECEIVER

BACKGROUND INFORMATION

1. Field:

The present disclosure relates generally to optical communications and, in particular, to transmitting information. Still more particularly, the present disclosure relates to a method and apparatus for transmitting information from multiple optical sources.

2. Background:

When transmitting information, different environments may be better suited than other environments for use of different components in a communications system. For example, with optical communications, a transmitter for optical signals may perform better in one type of environment than a receiver of the optical signal. As a result, in some environments, the transmitter may be able to transmit optical signals with a desired quality over greater distances. However, the receiver may be unable to detect the optical signal as well as desired in that particular environment.

For example, other optical signals may be present in the environment other than the optical signal transmitted from the transmitter to the receiver. These optical signals may be the result of sources other than from the transmitter of the optical signal meant to be detected by the receiver. These other optical signals may be background signals from various sources in the environment. These various sources of optical signals may be, for example, without limitation, reflections of sunlight, other optical signal transmitters, light sources and other sources that may reflect or transmit background signals in the environment. In these illustrative examples, light sources may include, for example, lights on buildings or vehicles. Reflections of sunlight may occur on buildings or vehicles.

The receiver may have difficulty detecting the transmitted optical signal with other optical signals being present in the environment. These other optical signals may have one or more characteristics that are similar to the optical signal that is to be detected. For example, these other optical signals may have similar frequencies, polarizations, and other characteristics that are similar to the optical signal that is to be detected. Thus, detection of the desired optical signal may be more difficult than desired.

In optical communications, considerable effort has been made to develop receivers that are able to identify an optical signal transmitted at a particular frequency from other optical signals that may be present in the environment. Techniques, such as single frequency filtering, have been employed. These techniques use frequency spatial timing polarization to select the correct transmission frequency for a communications link.

For example, single frequency filtering employs filters that separate the input signal into multiple components. As a result of the single frequency filtering, each component carries a single frequency sub-band of the original signal.

Depending on the environment, identifying the signal may be more challenging than desired even with currently used techniques for identifying optical signals. Therefore, it would be desirable to have a method and apparatus that takes into account at least some of the issues discussed above, as well as other possible issues.

SUMMARY

In one illustrative embodiment, a method for optical communication is present. A plurality of optical signals having a plurality of different frequencies is received at a receiver. The plurality of optical signals received at the receiver is sent through a non-linear optical element in the receiver such that a resulting optical signal is generated that has a frequency based on at least one of the plurality of different frequencies. Information is identified in the resulting optical signal.

In another illustrative embodiment, a method for optical communication is present. A first optical signal having a first frequency and a second optical signal having a second frequency is received at a receiver in which information is encoded in at least one of the first optical signal and the second optical signal. The first optical signal and the second optical signal received at the receiver are sent through a non-linear optical element in the receiver such that a resulting optical signal is generated. The resulting optical signal has a frequency selected from one of a sum of the first frequency and the second frequency, a difference between the first frequency and the second frequency, and a harmonic based on at least one of the first frequency and the second frequency. Information is identified in the resulting optical signal.

In yet another illustrative embodiment, an apparatus comprises a receiver. The receiver is configured to receive a plurality of optical signals having a plurality of different frequencies at the receiver. The receiver is further configured to send the plurality of optical signals received at the receiver through a non-linear optical element in the receiver such that a resulting optical signal is generated that has a frequency based on at least one of the plurality of different frequencies. The receiver is further configured to identify information in the resulting optical signal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
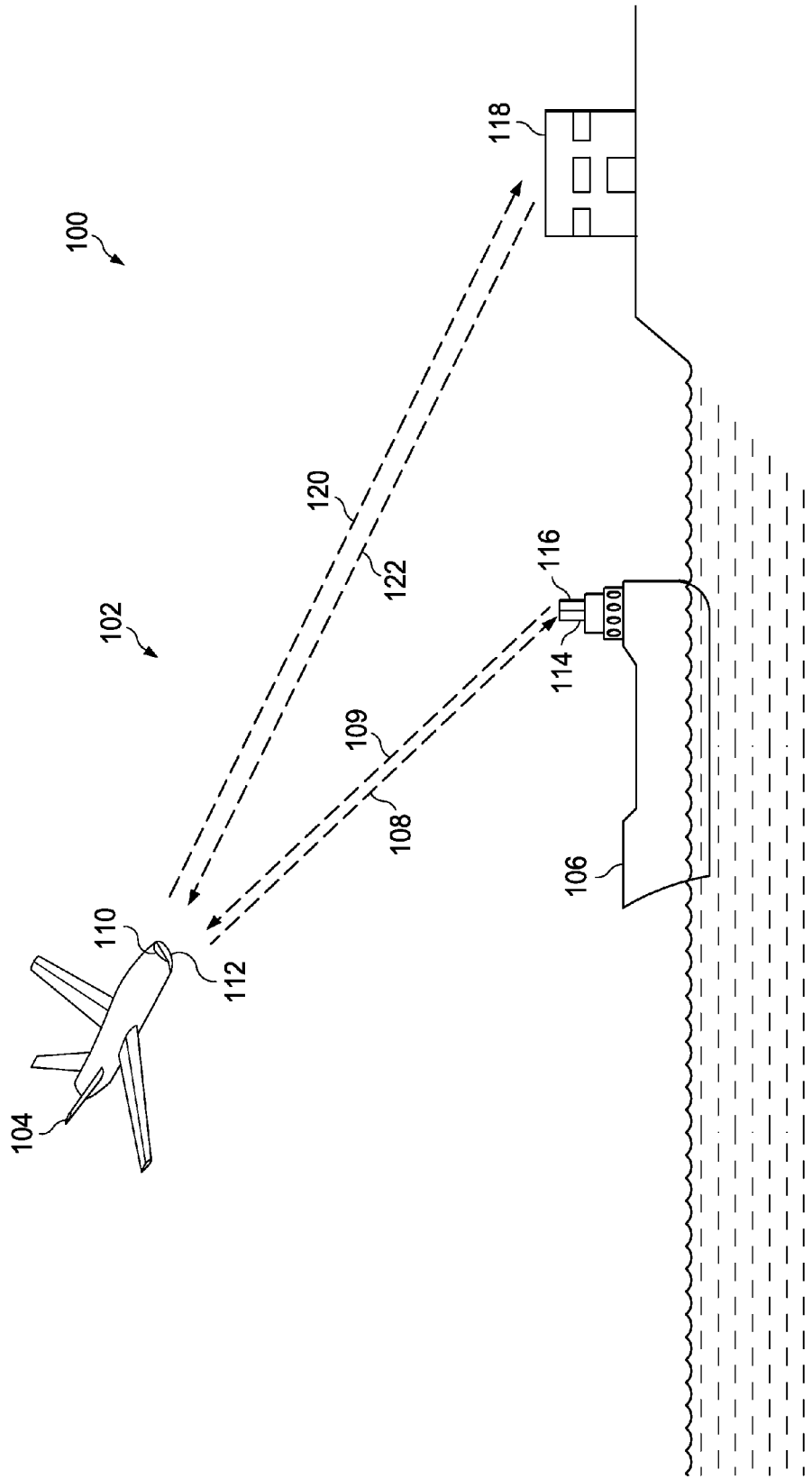
FIG. 1 is an illustration of an optical communications environment in which an illustrative embodiment may be implemented.

The illustrative embodiments recognize and take into account one or more different considerations. For example, the illustrative embodiments recognize and take into account that transmitters and receivers used in optical communications may have frequencies, polarizations, or other parameters at which they operate more efficiently. For example, with a selected set of atmospheric conditions, a transmitter may transmit optical signals using a first frequency. A receiver may have difficulty detecting the transmitted signals over the first frequency due to background optical signals in the environment. As a result, performing optical communications with the transmitter using the first frequency may not result in providing the best transmission of information over an optical signal.

In this case, using a second frequency may allow the receiver to more easily distinguish the transmitted optical signal from the background optical signals. The second frequency, however, may not be one used by the transmitter or may not provide a quality of optical signal that is desired for the particular distance between the transmitter and receiver. Thus, optical communications in this environment may not function as desired.

The illustrative embodiments also recognize and take into account that in some situations, deliberate interference with a transmitted optical signal may be present. For example, other optical signals may be deliberately transmitted using characteristics similar to those transmitted by a transmitter sending information to a receiver. These other optical signals may be transmitted by one or more additional optical signal sources to provide interference between the transmitter and the receiver. The additional optical signal sources may be adversaries or competitors of the operator of the transmitter and/or receiver. As a result of this interference, the receiver may be unable to properly identify optical signals sent by the transmitter.

The illustrative embodiments also recognize and take into account that it would be desirable to change the frequency of the signal received by the receiver. As a result, the receiver may be configured to process optical signals having a frequency that is different from the optical signals transmitted by the transmitter.

Thus, the illustrative embodiments provide a method and apparatus for optical communications. In one illustrative embodiment, a plurality of optical signals having a plurality of different frequencies is received at a receiver. The plurality of optical signals received at the receiver is sent through a non-linear optical element in the receiver. A resulting optical signal is generated that has a frequency based on at least one of the plurality of different frequencies. Information may then be identified using the resulting optical signal.

In this manner, the frequency of the optical signal received by the receiver may be different from the frequencies of the optical signals sent by the transmitters. As a result, an improvement in the ability of the receiver to identify information in the optical signal may occur for a receiver that may have better performance at a different frequency from which the optical signals containing the information were transmitted. Further, with the use of the illustrative embodiments, less interference may occur from optical signals in the background of the environment as compared to using currently available optical communications systems.

With reference now to the figures and in particular, with reference to FIG. 1, an illustration of an optical communications environment is depicted in accordance with an illustrative embodiment. In this depicted example, optical communications environment 100 includes communications that involve platforms 102. As depicted, platforms 102 include unmanned aerial vehicle 104 and surface ship 106.

As depicted, unmanned aerial vehicle 104 and surface ship 106 may communicate with each other using optical signals 108 and optical signals 109. Optical signals 108 are transmitted from unmanned aerial vehicle 104 to surface ship 106. Optical signals 109 are transmitted from surface ship 106 to unmanned aerial vehicle 104.

In this illustrative example, unmanned aerial vehicle 104 includes transmitters 110 and receiver 112. Surface ship 106 also includes transmitters 114 and receiver 116. In this illustrative example, unmanned aerial vehicle 104 may communicate with surface ship 106 using transmitters 110 and receiver 116. For example, unmanned aerial vehicle 104 may generate images of a target object. In this example, the target object is building 118. These images may be sent as information in optical signals 108 from transmitters 110 to receiver 116 on surface ship 106. Other information about building 118 may be transmitted back to receiver 112 in unmanned aerial vehicle 104 by transmitters 114 in surface ship 106.

In these illustrative examples, transmitters 110 in unmanned aerial vehicle 104 and transmitters 114 in surface ship 106 may transmit optical signals 108 and optical signals 109 using a particular frequency that may be more optimal for transmitting optical signals 108 and optical signals 109. In particular, the frequency selected for transmitting optical signals 108 may be one or more frequencies that provide a desired quality in transmitting optical signals over the distance between unmanned aerial vehicle 104 and surface ship 106.

As the distance between unmanned aerial vehicle 104 and surface ship 106 changes, the frequency selected for transmitting optical signals 108 and optical signals 109 may also change. The change in frequency may be selected to provide a desired transmission of optical signals 108 and optical signals 109 between unmanned aerial vehicle 104 and surface ship 106. In the illustrative examples, changes in frequency and other parameters in the configuration of transmitters 110, receiver 112, transmitters 114, and receiver 116 may be made as the environment and atmospheric conditions surrounding unmanned aerial vehicle 104 and/or surface ship 106 changes.

The frequency of optical signals 108 and optical signals 109 transmitted by transmitters 110 in unmanned aerial vehicle 104 and transmitters 114 on surface ship 106 may be, however, more difficult to detect by receiver 112 in unmanned aerial vehicle 104 and receiver 116 in surface ship 106 because of other optical signals in optical communications environment 100. These other optical signals in optical communications environment 100 may be, for example, without limitation, at least one of background optical signals, intentional optical signals, and other types of optical signals that interfere with optical communications between unmanned aerial vehicle 104 and surface ship 106.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In this illustrative example, the background optical signals are optical signals naturally present in optical communications environment 100. For example, reflections of sunlight may be a background optical signal present in optical communications environment 100.

Intentional optical signals are optical signals that are generated with the intent to reduce the ability of a receiver 116 on surface ship 106 and receiver 112 on unmanned aerial vehicle 104 to detect optical signals 108 and optical signals 109, respectively. For example, these intentional optical signals may come from optical signal sources such as an adversary or a competitor of the operators of unmanned aerial vehicle 104 and surface ship 106, persons within or around building 118, or some other intentional optical source.

In these illustrative examples, the transmission of optical signals 108 may be performed in a manner that reduces the effect of other optical signals on the ability of receiver 112 in unmanned aerial vehicle 104 and receiver 116 on surface ship 106 to detect optical signals 108. As depicted, unmanned aerial vehicle 104 transmits optical signals 108 using transmitters 110 with a plurality of different frequencies. In other words, each transmitter in transmitters 110 may send an optical signal in optical signals 108 to receiver 116 in surface ship 106 with a different frequency. In this illustrative example, at least one of optical signals 108 transmitted by transmitters 110 may include the information for the images of building 118 generated by unmanned aerial vehicle 104.

Receiver 116 receives and processes optical signals 108. In these illustrative examples, receiver 116 includes a non-linear optical element such that a resulting optical signal is generated from optical signals 108. The resulting optical signal has a frequency based on at least one of the frequencies for optical signals 108. Receiver 116 may then identify the information in the resulting optical signal.

Thus, the frequencies for optical signals 108 may be selected such that the resulting optical signal may be detected by receiver 116. This detection may occur more easily even though other optical signals are present in optical communications environment 100. For example, the frequency of the resulting optical signal may be selected to be one that is different from those that may be present in optical communications environment 100. The frequency of the resulting optical signal may be based on the frequency selected for transmitting optical signals 108 by transmitters 110 in unmanned aerial vehicle 104 to receiver 116 in surface ship 106. In this manner, the frequency used by receiver 116 may be different than the frequencies used by transmitters 110. Thus, optical communications within optical communications environment 100 may occur more efficiently and with greater quality.

In a similar fashion, optical signals 109 may be transmitted from surface ship 106 to unmanned aerial vehicle 104. For example, optical signals 109 may include information in the form of commands for unmanned aerial vehicle 104. These commands may direct unmanned aerial vehicle 104 on different routes or select different target objects for surveillance.

Further, in other illustrative examples, unmanned aerial vehicle 104 may use other objects within optical communications environment 100 to communicate with one or more receivers in optical communications environment 100. For example, unmanned aerial vehicle 104 may transmit optical signals 120 toward building 118. At least a portion of optical signals 120 may be reflected by building 118 as reflected optical signals 122. Receiver 112 may detect reflected optical signals 122.

In these illustrative examples, transmitters 110 transmit optical signals 120 using a plurality of different frequencies. Reflected optical signals 122 are received by receiver 112. Receiver 112 generates a resulting optical signal that has a frequency based on at least one of the frequencies of reflected optical signals 122 received by receiver 112. In this illustrative example, the information in reflected optical signals 122 are changes to optical signals 120 caused by a reflection of optical signals 120. In some illustrative examples, the information in reflected optical signals 122 may be a time when reflected optical signals 122 are detected after a transmission of optical signals 120.

In still other illustrative examples, unmanned aerial vehicle 104 and surface ship 106 may communicate with other receivers in optical communications environment 100. For example, without limitation, unmanned aerial vehicle 104 may transmit optical signals from transmitters 110 to a mobile receiver on shore, a receiver in building 118, another ship, a vehicle, or some other suitable receiver. These optical signals may also be reflected from other objects in optical communications environment 100 other than building 118.

In this manner, optical communications may be performed using different frequencies for the transmitters and receivers within optical communications environment 100. With the different frequencies, the transmitters and receivers may be selected in a manner that allows these components to perform more desirably when the environment results in different frequencies being better for transmitters versus receivers.

Further, in these illustrative examples, when the receiver uses a different frequency than the transmitter, the detection of information in optical signals 108 or reflected optical signals 122 by other sources other than unmanned aerial vehicle 104 and surface ship 106 may be less likely since different frequencies are used. Thus, information transmitted in optical signals 108, optical signals 109, or reflected optical signals 122 may be more secure.

Figure 2:
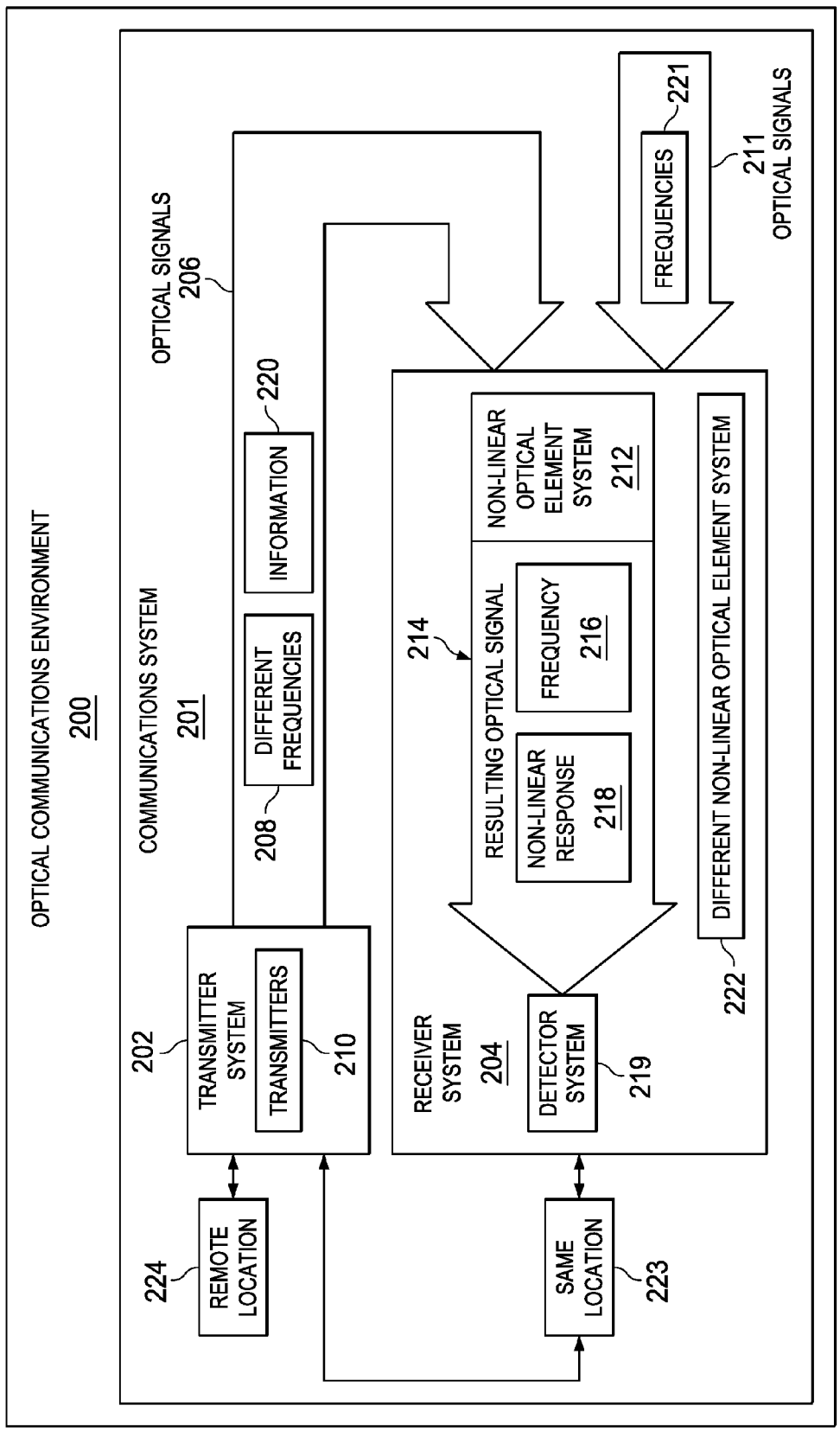
FIG. 2 is an illustration of a block diagram of an optical communications environment in accordance with an illustrative embodiment.

Turning now to FIG. 2, an illustration of a block diagram of an optical communications environment is depicted in accordance with an illustrative embodiment. In this depicted example, optical communications environment 100 in FIG. 1 is an example of one implementation for optical communications environment 200 shown in block form in FIG. 2.

As depicted, optical communications environment 200 includes communications system 201. As depicted, communications system 201 is comprised of transmitter system 202 and receiver system 204. Transmitter system 202 is configured to transmit optical signals 206 at a plurality of different frequencies 208. As depicted, transmitter system 202 includes transmitters 210. Each transmitter in transmitters 210 may transmit an optical signal in optical signals 206 at a different frequency in the plurality of different frequencies 208 from other transmitters in transmitters 210.

Receiver system 204 may receive optical signals 206. In these illustrative examples, optical signals 206 may be more difficult to identify for receiver system 204 when receiver system 204 also receives optical signals 211. Optical signals 211 may be at least one of background optical signals, intentional optical signals, and other optical signals other than optical signals 206 that may be present in optical communications environment 200.

As depicted, receiver system 204 includes non-linear optical element system 212. Non-linear optical element system 212 is configured to generate resulting optical signal 214 from optical signals 206 received by receiver system 204. Resulting optical signal 214 has frequency 216. Frequency 216 is based on at least one of the plurality of different frequencies 208 in these illustrative examples. Resulting optical signal 214 is non-linear response 218 generated by non-linear optical element system 212.

In this illustrative example, at least one of optical signals 206 may include information 220. Information 220 may be information encoded within optical signals 206. In other illustrative examples, information 220 may be generated from resulting optical signal 214 based on other parameters. For example, information 220 may be a time when resulting optical signal 214 is detected after optical signals 206 are transmitted.

The detection of resulting optical signal 214 may be easier than detecting optical signals 206 because of frequency 216. Frequency 216 may be an optimal frequency for operation of receiver system 204. For example, frequency 216 may be more easily detected by detector system 219 based on the conditions in optical communications environment 200.

In these illustrative examples, frequency 216 may be different from frequencies 221 for optical signals 211. In particular, receiver system 204 may be configured to detect frequency 216. Further, frequency 216 may be changed depending on frequencies 221 of optical signals 211. Frequency 216 may be selected as a frequency that is sufficiently different from frequencies 221 that allow for easier detection of resulting optical signal 214 by receiver system 204.

The change in frequency 216 may be accomplished in a number of different ways. A number as used herein with reference to items means one or more items. For example, a number of ways is one or more ways.

In one example, the plurality of different frequencies 208 may be selected such that non-linear optical element system 212 generates resulting optical signal 214 with a desired value for frequency 216. In other illustrative examples, non-linear optical element system 212 may be changed.

In still other illustrative examples, different non-linear optical element system 222 may be used in addition to or in place of non-linear optical element system 212. Different non-linear optical element system 222 may generate resulting optical signal 214 with a different value for frequency 216.

In this illustrative example, transmitter system 202 and receiver system 204 may be in same location 223. In other illustrative examples, transmitter system 202 may be in remote location 224 from the location of receiver system 204. Further, in other illustrative examples, portions of transmitter system 202 may be in different locations.

Figure 3:
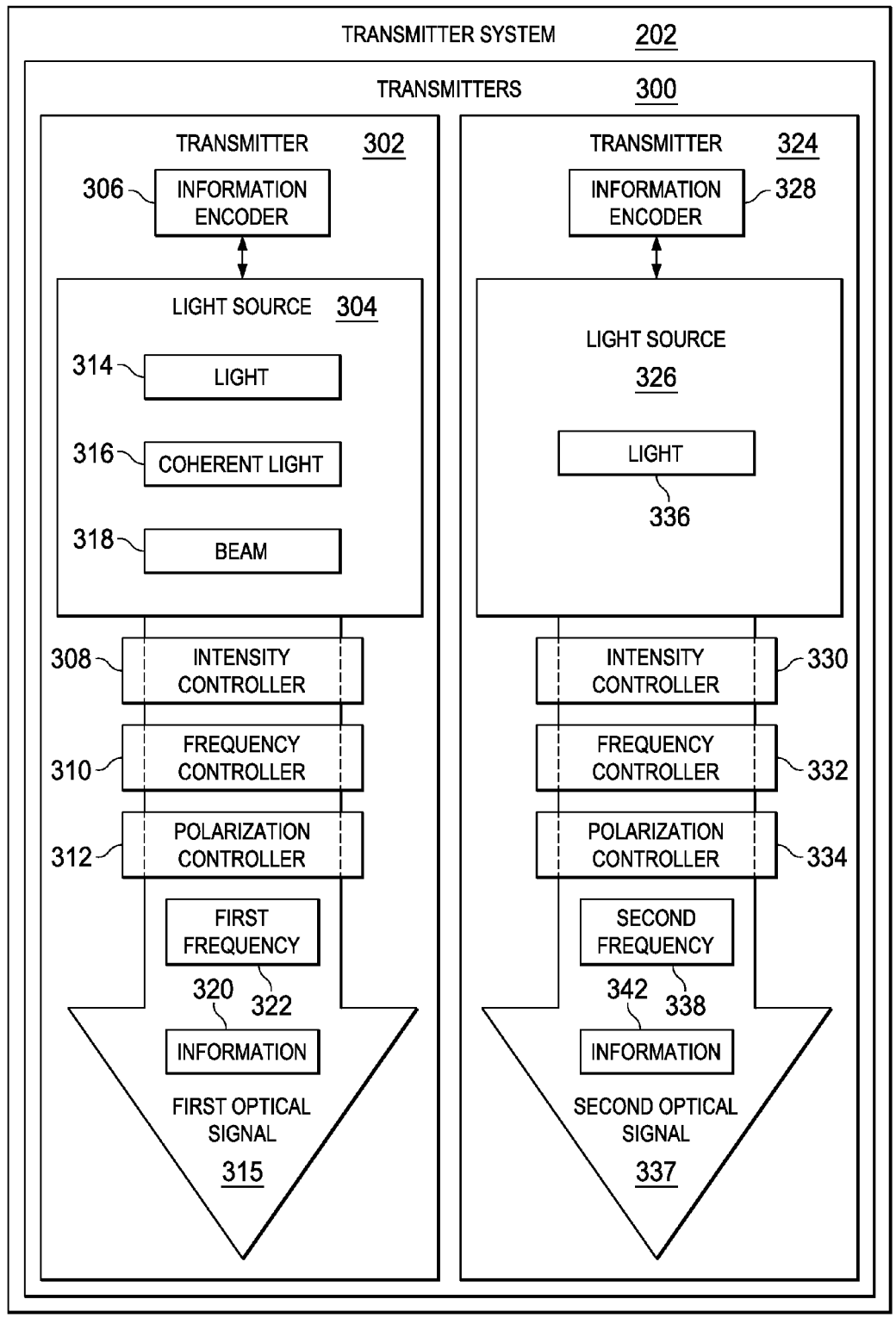
FIG. 3 is an illustration of a transmitter system in accordance with an illustrative embodiment.

Turning now to FIG. 3, an illustration of a transmitter system is depicted in accordance with an illustrative embodiment. In this illustrative example, components that may be used to implement transmitter system 202 in FIG. 2 are depicted.

Transmitter system 202 is comprised of transmitters 300. Transmitter 302 in transmitters 300 is comprised of light source 304, information encoder 306, intensity controller 308, frequency controller 310, and polarization controller 312. Light source 304 is configured to generate light 314.

In these illustrative examples, light source 304 is hardware and may take a number of different forms. For example, without limitation, light source 304 may be implemented using at least one of a laser, a light emitting diode, a halogen light, or some other suitable type of light source. As depicted, light source 304 may be a light source that operates at a high frequency. For example, light source 304 may be a pulsed laser in these illustrative examples.

Light 314 may take various forms. For example, light 314 may be light in the visible spectrum, the infrared spectrum, the ultraviolet spectrum, or other spectrum for light. For example, the wavelength of light 314 may be from about 300 nanometers to about 1 millimeter.

In these illustrative examples, light 314 forms first optical signal 315. First optical signal 315 is an example of an optical signal in optical signals 206 in FIG. 2. Light 314 generated by light source 304 for first optical signal 315 may be, for example, coherent light 316 and may take the form of beam 318.

As depicted, first optical signal 315 also may include information 320. Information 320 may be encoded into light 314 for first optical signal 315 by information encoder 306. For example, information encoder 306 may encode information by changing the intensity of light 314, the phase of light 314, or other characteristics of light 314 in first optical signal 315.

In these illustrative examples, information encoder 306 may be implemented in hardware. Information encoder 306 may be implemented using one or more modulator devices that provide at least one of frequency, amplitude, or phase modulation. These modulator devices may be electro-optical modulators. Electro-optical modulators may cause small variations about the base amplitude, frequency, or phase that can be created by passing the wave through a medium. This medium may have desired optical and electro-optical properties in these illustrative examples.

As first optical signal 315 passes through transmitter 302, other components in transmitter 302 may condition first optical signal 315 for transmission. For example, intensity controller 308 may adjust the intensity of light 314. For example, intensity controller 308 may reduce the intensity of first optical signal 315 depending on the particular implementation.

Decreasing the intensity of first optical signal 315 may lessen the performance requirements of transmitter 302. In other words, decreasing the intensity of first optical signal 315 with intensity controller 308 may make transmission of first optical signal 315 easier in a particular environment.

Further, this decrease in the intensity of first optical signal 315 by intensity controller 308 will not affect the performance of a receiver system, such as receiver system 204 in FIG. 2. In these illustrative examples, intensity controller 308 may be implemented using at least one of a saturable absorber, a polarizer, a filter, and some other suitable type of material that may control the intensity of first optical signal 315 for transmitter 302.

Frequency controller 310 may adjust the frequency in first optical signal 315. For example, frequency controller 310 may remove undesired frequencies from first optical signal 315 such that first optical signal 315 has first frequency 322. Frequency controller 310 also may adjust first frequency 322 in first optical signal 315.

In these illustrative examples, frequency controller 310 is implemented in hardware and may be implemented using a number of different types of devices. For example, frequency controller 310 may be implemented in one or more devices selected from at least one of a frequency comb, an acousto-optic modulator, an electro-optic modulator, and other suitable devices.

Polarization controller 312 is configured to adjust the polarization of first optical signal 315. For example, polarization controller 312 may change the direction in which the electric field oscillates as first optical signal 315 propagates. Light 314 in first optical signal 315 may have linear polarization, circular polarization, or some other type of polarization controlled by polarization controller 312. Further, polarization controller 312 may only propagate first optical signal 315 in these optical signals with a selected polarization.

As depicted, polarization controller 312 may be implemented in hardware. Polarization controller 312 may be implemented using one or more devices selected from at least one of a wire-grid polarizer, an absorptive polarizer, a beam-splitter polarizer, a circular polarizer, and other suitable devices.

In a similar fashion, transmitter 324 may include light source 326, information encoder 328, intensity controller 330, frequency controller 332, and polarization controller 334. Light source 326 is configured to generate light 336 for second optical signal 337. Second optical signal 337 is an example of another optical signal in optical signals 206 in FIG. 2.

Second optical signal 337 has second frequency 338 in these illustrative examples. Second frequency 338 is different from first frequency 322 in these illustrative examples. Second optical signal 337 may or may not have information 342 encoded in second optical signal 337 by information encoder 328.

In this manner, transmitter system 202 may transmit a plurality of optical signals. In these illustrative examples, the selection of first frequency 322 for first optical signal 315 and second frequency 338 for second optical signal 337 may be selected in a manner such that receiver system 204 in FIG. 2 is more likely to detect these two optical signals when transmitted by transmitter 302 and transmitter 324.

Thus, intensity controller 308, frequency controller 310, and polarization controller 312 may allow transmitter 302 transmitting light 314 to operate as desired. Similarly, intensity controller 330, frequency controller 332, and polarization controller 334 may allow transmitter 324 transmitting light 336 to operate as desired.

Figure 4:
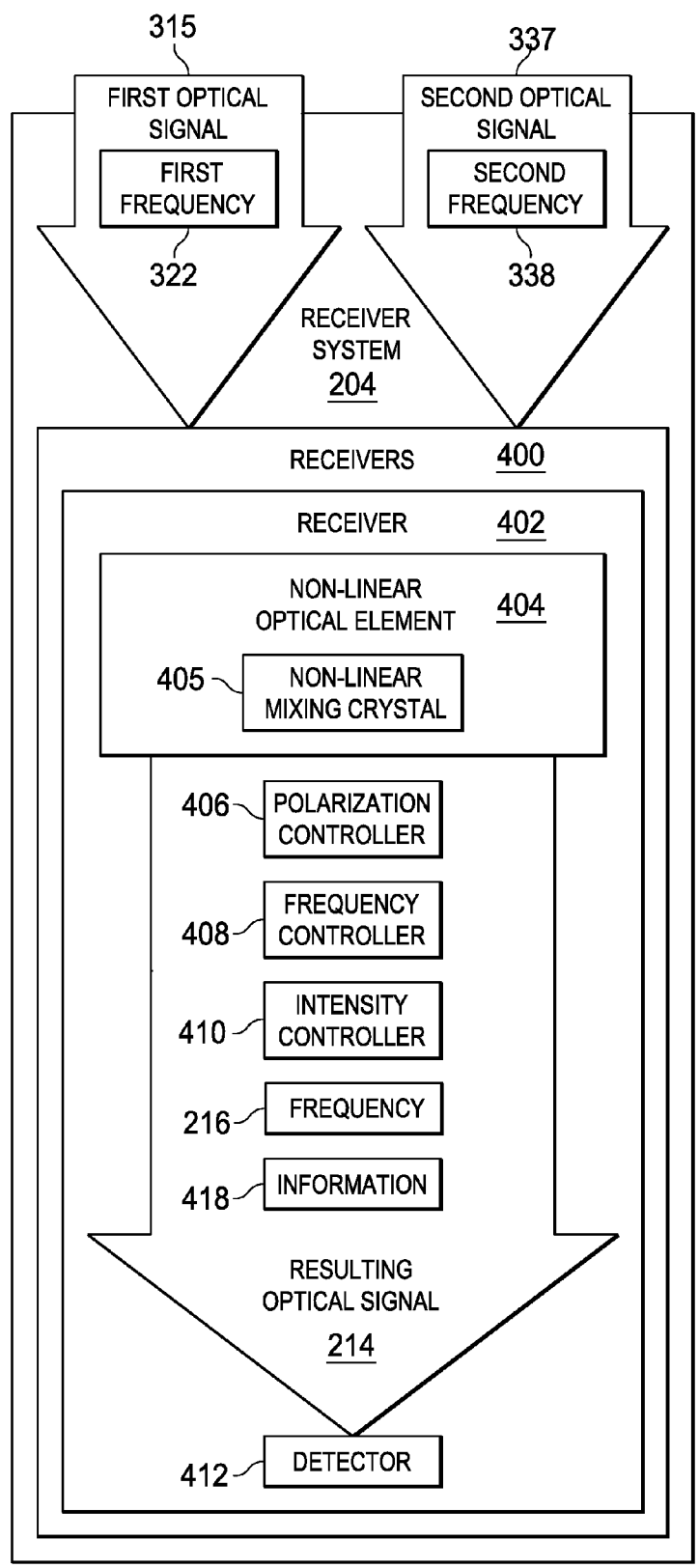
FIG. 4 is an illustration of a receiver system in accordance with an illustrative embodiment.

Turning now to FIG. 4, an illustration of a receiver system is depicted in accordance with an illustrative embodiment. In this illustrative example, components that may be used to implement receiver system 204 in FIG. 2 are depicted.

As illustrated, receiver system 204 is comprised of a number of receivers 400. Receiver 402 is an example of a receiver in receivers 400. As depicted, receiver 402 includes a number of components such as non-linear optical element 404, polarization controller 406, frequency controller 408, intensity controller 410 and detector 412. The different components in receiver 402 are configured to condition and detect these optical signals.

In these illustrative examples, non-linear optical element 404 is an example of an element in non-linear optical element system 212 in FIG. 2 and is configured to receive optical signals, such as first optical signal 315 and second optical signal 337 in FIG. 3 transmitted in optical signals 206 from transmitter system 202 in FIG. 2.

Non-linear optical element 404 is configured to generate resulting optical signal 214. In particular, non-linear optical element 404 is configured to mix optical signals transmitted from transmitter 302 and transmitter 324, such as first optical signal 315 and second optical signal 337 in FIG. 3 to generate resulting optical signal 214.

Non-linear optical element 404 may be implemented using a number of different types of materials. For example, without limitation, non-linear optical element 404 may be non-linear mixing crystal 405.

In these illustrative examples, non-linear mixing crystal 405 may be one of β-barium borate, potassium dihydrogen phosphate, lithium iodate, potassium niobate, monopotassium phosphate, lithium triborate, potassium titanyl phosphate, lithium niobate, ammonium dihydrogen phosphate, and other suitable types of non-linear mixing crystals. Non-linear mixing crystal 405 may be selected based on the desired operation of receiver 402 in receivers 400. As an example, non-linear mixing crystal 405 may be selected such that non-linear mixing crystal 405 generates resulting optical signal 214 with frequency 216 in a desired manner.

Resulting optical signal 214 generated by non-linear optical element 404 has frequency 216. In these illustrative examples, frequency 216 is generated based on at least one of first frequency 322 and second frequency 338 in FIG. 3.

For example, frequency 216 may be the sum of first frequency 322 and second frequency 338. In another example, frequency 216 may be a difference between first frequency 322 and second frequency 338. In still another illustrative example, frequency 216 may be a multiple of at least one of first frequency 322 and second frequency 338. In particular, frequency 216 may be a harmonic that is based off of at least one of first frequency 322 and second frequency 338.

For example, frequency 216 generated by non-linear optical element 404 may be a second harmonic generation. In this illustrative example, two photons are combined to generate a single photon at two times the frequency. In other illustrative examples, frequency 216 generated by non-linear optical element 404 may be a third harmonic, a fourth harmonic, or some other suitable frequency generation.

In these illustrative examples, non-linear mixing crystal 405 is selected such that frequency 216 may be generated in a desired manner. For example, if frequency 216 is a second harmonic frequency, a particular non-linear mixing crystal may be selected to provide appropriate phase matching to generate frequency 216.

Polarization controller 406 is configured to adjust the polarization of resulting optical signal 214. For example, polarization controller 406 may only propagate resulting optical signal 214 with a selected polarization.

Frequency controller 408 may be configured to only propagate a selected frequency or number of frequencies of light in resulting optical signal 214. For example, frequency controller 408 may filter in resulting optical signal 214 based on the appropriate frequency for use by detector 412 in these illustrative examples.

Intensity controller 410 is configured to adjust the intensity of the light in resulting optical signal 214. For example, the intensity of resulting optical signal 214 may be greater than a desired level. Intensity controller 410 may reduce the intensity of resulting optical signal 214 to a desired level. This desired level may be a level configured for use by detector 412.

In these illustrative examples, detector 412 may be implemented in hardware and is an example of a detector in detector system 219. In these illustrative examples, detector 412 may be generated in a number of different ways. Detector 412 may be implemented using one or more devices selected from at least one of a photocell, a charge-coupled device (CCD), a complimentary metal-oxide-semiconductor (CMOS) device, a fiber optic sensor, a photodiode, a phototransistor, and other suitable types of devices configured to detect optical signals.

As depicted, detector 412 is configured to detect resulting optical signal 214. For example, detector 412 may generate an electrical signal in response to detecting resulting optical signal 214. The voltage, current, or other characteristics of the electrical signal generated may depend on the intensity of resulting optical signal 214. In this manner, if information 418 is encoded using the intensity of resulting optical signal 214, the electrical signal may be used to identify the information in resulting optical signal 214.

Thus, non-linear optical element 404 in receiver 402 provides mixing of optical signals for use by detector 412 in identifying information 418. In this manner, receiver 402 may provide more accurate and more secure detection of information 418 in these illustrative examples.

The illustration of optical communications environment 200 and the different components in optical communications environment 200 in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although transmitters and receivers have been shown associated with platforms in the form of an unmanned aerial vehicle and a surface ship, the transmitters and receivers may be associated with other types of platforms. These platforms may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a building, a tree, a mountainside, a radio tower, a person, and other suitable objects.

In still other illustrative examples, multiple transmitter systems may be present in communications system 201 other than transmitter system 202 in FIG. 2. As an example, one transmitter system may be present in same location 223 and a second transmitter system may be present in remote location 224 in FIG. 2. Of course, other numbers of transmitter systems may be present within optical communications environment 200 in FIG. 2, depending on the particular implementation.

In a similar fashion, other receiver systems other than receiver system 204 may also be present in optical communications environment 200 in FIG. 2. These receiver systems may be in same location 223 or remote location 224 in FIG. 2 in these illustrative examples.

Although transmitter system 202 with transmitters 300 is shown with two transmitters in the illustrative example in FIG. 3, other numbers of transmitters may be present in transmitters 300. For example, without limitation, three transmitters, four transmitters, or some other suitable number of transmitters may be present in transmitter system 202, depending on the particular implementation.

Figure 5:
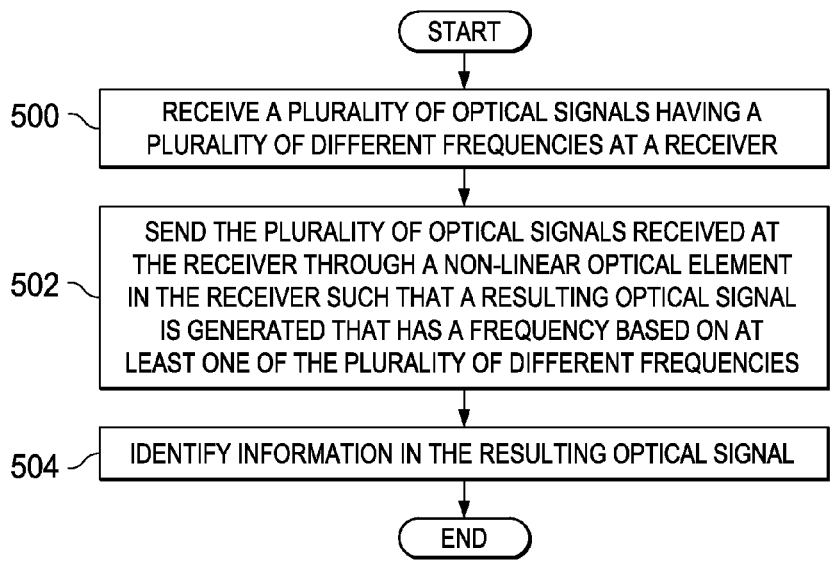
FIG. 5 is an illustration of a flowchart of a process for optical communication in accordance with an illustrative embodiment.

Turning now to FIG. 5, an illustration of a flowchart of a process for optical communication is depicted in accordance with an illustrative embodiment. The process illustrated in FIG. 5 may be implemented in optical communications environment 200 in FIG. 2. In particular, the operations illustrated in this figure may be implemented in receiver 402 in FIG. 4.

The process begins by receiving a plurality of optical signals having a plurality of different frequencies at a receiver (operation 500). The process then sends the plurality of optical signals received at the receiver through a non-linear optical element in the receiver such that a resulting optical signal is generated that has a frequency based on at least one of the plurality of different frequencies (operation 502).

In this illustrative example, the resulting optical signal has characteristics based on the different frequencies of the optical signals in this illustrative example. For example, the resulting optical signal may have a frequency that is a sum of the different frequencies, a difference of the different frequencies, or a harmonic of the different frequencies.

The process then identifies information in the resulting optical signal (operation 504). The process terminates thereafter.

Figure 6:
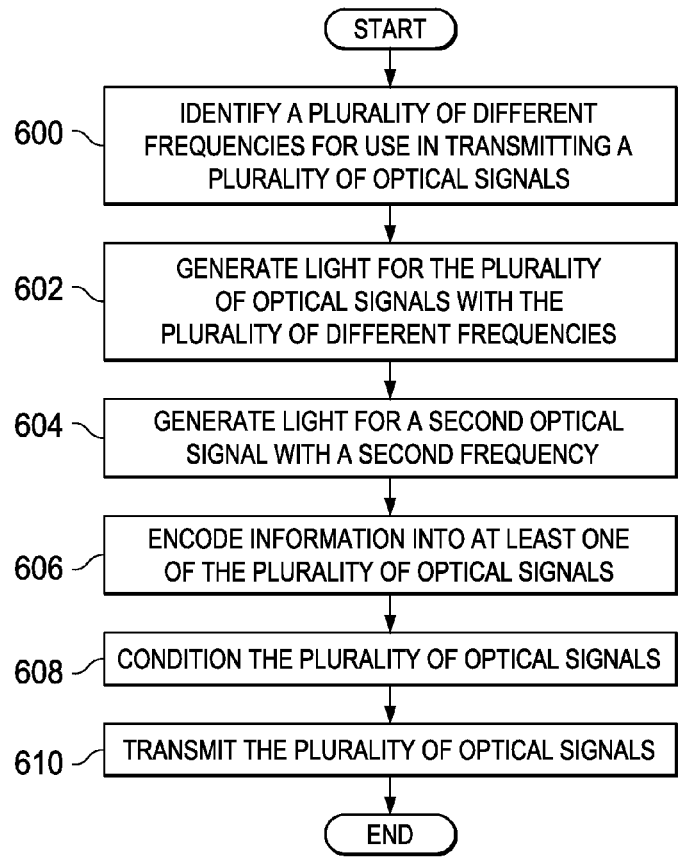
FIG. 6 is an illustration of a flowchart of a process for optical communication in accordance with an illustrative embodiment.

With reference now to FIG. 6, an illustration of a flowchart of a process for optical communication is depicted in accordance with an illustrative embodiment. The process illustrated in FIG. 6 may be implemented in optical communications environment 200 in FIG. 2. The operations may be performed using transmitters 300 in FIG. 3.

The process begins by identifying a plurality of different frequencies for use in transmitting a plurality of optical signals (operation 600). These frequencies are different frequencies from each other such that each of the plurality of optical signals has a different frequency from other frequencies for other optical signals in the plurality of optical signals. The plurality of different frequencies may be selected such that the receiver mixes the plurality of optical signals to form a resulting optical signal with a desired frequency for detection by a detector in the receiver.

The process then generates light for the plurality of optical signals with the plurality of different frequencies (operation 602). The process then generates light for a second optical signal with a second frequency (operation 604). Information is encoded into at least one of the plurality of optical signals (operation 606).

The plurality of optical signals is conditioned (operation 608). This conditioning may include adjusting characteristics of the first optical signal and the second optical signal. These characteristics may include intensity, frequency, polarization, and other characteristics of the plurality of optical signals. The process then transmits the plurality of optical signals (operation 610), with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits, optical elements, or other hardware devices that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the step of encoding information into one of the plurality of optical signals in operation 606 may be omitted. The information may be present in the optical signals based on changes in the optical signals when the optical signals are reflected or scattered off of an object.

In some illustrative examples, more than two optical signals may be sent to a receiver system. These receivers may be frequency selective receivers. In this example, a receiver may select a subset of optical signals sent through the non-linear element. The selection of the particular subset of frequencies by the frequency selective receiver may be determined by the chemical properties of that receiver.

Figure 7:
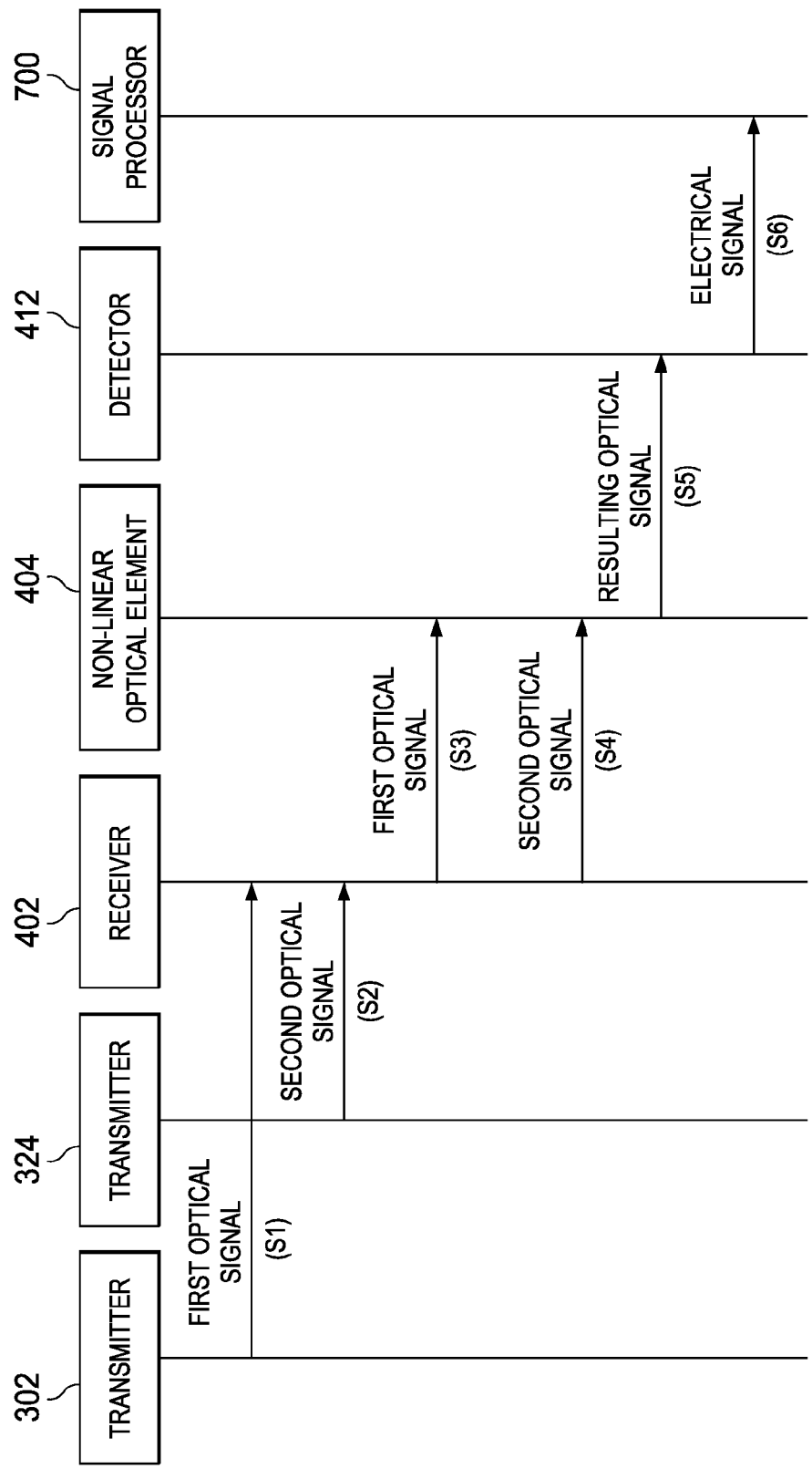
FIG. 7 is a message flow diagram for optical communications in accordance with an illustrative embodiment.

Turning now to FIG. 7, a message flow diagram for optical communications is depicted in accordance with an illustrative embodiment. The different messages in this illustrative example may be generated using components in optical communications environment 200 as depicted in FIGS. 2-4.

In this example, the message flow illustrates some components from optical communications environment 200 in FIGS. 2-4. For example, the different messages are sent in between components that include transmitter 302, transmitter 324, receiver 402, non-linear optical element 404, and detector 412. Signal processor 700 is a new component in this message flow.

In this illustrative example, transmitter 302 transmits a first optical signal to a receiver 402 (message S1) and transmitter 324 transmits a second optical signal to receiver 402 (message S2). In response, receiver 402 sends the first signal into non-linear optical element 404 (message S3). Receiver 402 also sends the second optical signal into non-linear optical element 404 (message S4).

The first optical signal and the second optical signal are mixed in non-linear optical element 404 to generate a resulting optical signal. The resulting optical signal is sent to detector 412 (message S5). In response, detector 412 may generate electrical signals and send the electrical signals to signal processor 700 for processing (message S6).

Signal processor 700 may identify information in the electrical signals that was encoded in at least one of the first optical signal and the second optical signal. In these illustrative examples, signal processor 700 may be implemented using a number of different types of hardware devices that may include software. For example, signal processor 700 may be a computer, an integrated circuit, a programmable logic array, or some other suitable type of device.

Figure 8:
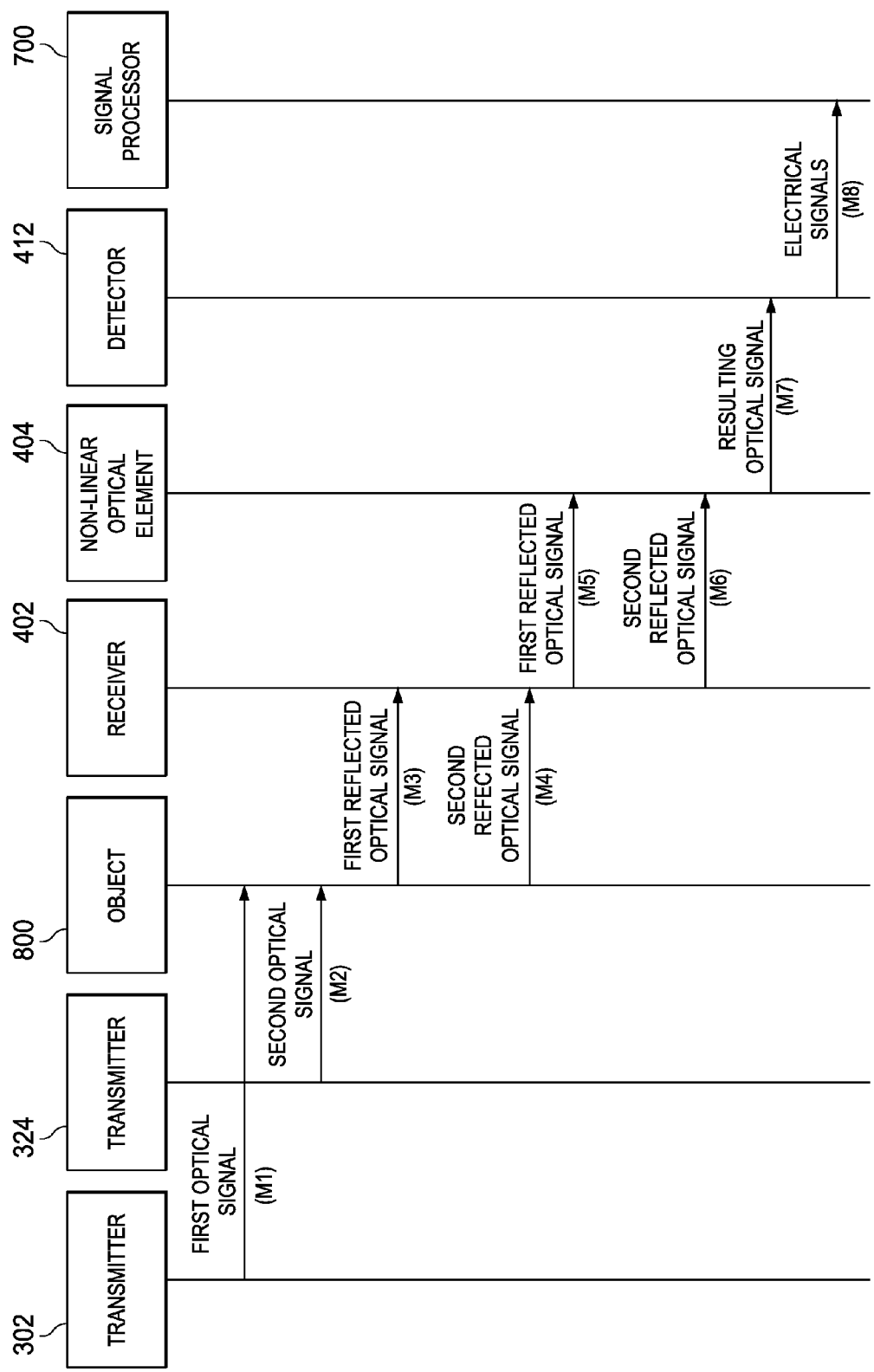
FIG. 8 is a message flow diagram for optical communications in accordance with an illustrative embodiment.

Turning now to FIG. 8, a message flow diagram for optical communications is depicted in accordance with an illustrative embodiment. The different messages in this illustrative example may be generated using components in optical communications environment 200 as depicted in FIGS. 2-4.

As illustrated, the message flow involves some components from optical communications environment 200 in FIGS. 2-4 and the message flow in FIG. 7. For example, the different messages are sent between components that include transmitter 302, transmitter 324, receiver 402, non-linear optical element 404, detector 412, and signal processor 700. Object 800 is a new component in this message flow.

In this illustrative example, transmitter 302 transmits a first optical signal towards object 800 (message M1) and transmitter 324 transmits a second optical signal towards object 800 (message M2). In response to the first optical signal hitting object 800, a first reflected optical signal is reflected off of object 800 and received by receiver 402 (message M3). A second reflected optical signal is reflected from object 800 and detected by receiver 402 (message M4).

Receiver 402 sends the first reflected optical signal into non-linear optical element 404 (message M5). Receiver 402 also sends the second reflected optical signal into non-linear optical element 404 (message M6).

The first reflected optical signal and the second reflected optical signal are mixed in non-linear optical element 404 to generate a resulting optical signal. The resulting optical signal is sent to detector 412 (message M7). In response, detector 412 may generate electrical signals and send the electrical signals to signal processor 700 for processing (message M8).

Signal processor 700 may identify information in the electrical signals generated from the first reflected optical signal and the second reflected optical signal being reflected off of object 800. For example, the information may be changes in the characteristics in the first optical signal and the second optical signal when they are reflected as a first reflected optical signal and a second reflected optical signal. In other examples, the information may be derived based on the time between when the first optical signal and the second optical signal were transmitted and when the resulting optical signal is detected.

The illustration of message flows between different components is not meant to limit the manner in which different illustrative embodiments may be implemented. For example, a number of transmitters in addition to the ones illustrated may be used. Also, message flow involving conditioning of the optical signals also may be included although not shown in these examples.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for optical communication, the method comprising:
   receiving a plurality of optical signals having a plurality of different frequencies at a receiver system;
   sending the plurality of optical signals received at the receiver system through a first non-linear optical element in the receiver system such that a first resulting optical signal is generated that has a first frequency based on a combination of the plurality of different frequencies;
   sending the plurality of optical signals received at the receiver system through a second non-linear optical element in the receiver system such that a second resulting optical signal is generated that has a second frequency based on a combination of the plurality of different frequencies;
   selecting one of the first resulting optical signal or the second resulting optical signal as a selected optical signal, wherein the selected optical signal is different from at least one other optical signal received at the receiver, the other optical signal comprising an optical signal selected from the group consisting of background optical signals, intentional optical signals, and combinations thereof; and
   identifying information in the selected optical signal.

2. The method of claim 1, wherein the plurality of optical signals is sent from a number of transmitters located at one of a same location as the receiver and a remote location to the receiver.

3. The method of claim 1, wherein at least one of the plurality of optical signals is reflected from an object prior to being received at the receiver.

4. The method of claim 1, wherein the information is present in the combination of the plurality of optical signals.

5. The method of claim 1, wherein the resulting optical signal has a frequency that is a sum of the plurality of different frequencies.

6. The method of claim 1, wherein the resulting optical signal has a frequency that is a difference between the plurality of different frequencies.

7. The method of claim 1, wherein the resulting optical signal has a frequency that is a harmonic based on at least one of the plurality of different frequencies.

8. The method of claim 1, wherein the non-linear optical element is comprised of a material selected from at least one of a β-barium borate, potassium dihydrogen phosphate, potassium titanyl phosphate, lithium niobate, lithium iodate, potassium niobate, monopotassium phosphate, and ammonium dihydrogen phosphate.

9. A method for optical communication, the method comprising:
- receiving a first optical signal having a first frequency and a second optical signal having a second frequency at a receiver system in which information is encoded in at least one of the first optical signal and the second optical signal;
- sending the first optical signal and the second optical signal received at the receiver system through a plurality of non-linear optical element in the receiver such that a plurality of resulting optical signal is generated, in which the plurality resulting optical signal comprises a first resulting optical signal having a frequency of a difference between the first frequency and the second frequency, and a second resulting optical signal having a frequency based on a harmonic of at least one of the first frequency and the second frequency; and;
- selecting one of the plurality of resulting optical signal as a selected optical signal, wherein the selected optical signal is different from at least one other optical signal received at the receiver, the other optical signal comprising an optical signal selected from the group consisting of background optical signals, intentional optical signals, and combinations thereof
- identifying information in the resulting optical signal.

10. The method of claim 9, wherein the non-linear optical element is comprised of a material selected from at least one of a β-barium borate, potassium dihydrogen phosphate, potassium titanyl phosphate, lithium niobate, lithium iodate, potassium niobate, monopotassium phosphate, and ammonium dihydrogen phosphate.

11. An apparatus comprising:
- a receiver configured: to receive a plurality of optical signals having a plurality of different frequencies at the receiver; to send the plurality of optical signals received at the receiver through a first non-linear optical element in the receiver such that a first resulting optical signal is generated that has a first frequency based on a combination of the plurality of different frequencies; to send the plurality of optical signals received at the receiver through a second non-linear optical element in the receiver such that a second resulting optical signal is generated that has a second frequency based on a combination of the plurality of different frequencies; to select one of the first resulting optical signal or the second resulting optical signal as a selected optical signal, wherein the selected optical signal is different from at least one other optical signal received at the receiver, the other optical signal comprising an optical signal selected from the group consisting of background optical signals, intentional optical signals, and combinations thereof; and to identify information in the resulting optical signal.

12. The apparatus of claim 11 further comprising:
- a detector in the receiver, wherein the detector is configured to detect optical signals having the frequency.

13. The apparatus of claim 11, wherein the plurality of optical signals is sent from a number of transmitters located at one of a same location as the receiver and a remote location to the receiver.

14. The apparatus of claim 11, wherein at least one of the plurality of optical signals is reflected from an object prior to being received at the receiver.

15. The apparatus of claim 11, wherein the information is present in the combination of the plurality of optical signals.

16. The apparatus of claim 11, wherein the resulting optical signal has a frequency that is a sum of the plurality of different frequencies.

17. The apparatus of claim 11, wherein the resulting optical signal has a frequency that is a difference between the plurality of different frequencies.

18. The apparatus of claim 11, wherein the resulting optical signal has a frequency that is a harmonic based on at least one of the plurality of different frequencies.

19. The apparatus of claim 11, wherein the non-linear optical element is comprised of a material selected from at least one of a β-barium borate, potassium dihydrogen phosphate, potassium titanyl phosphate, lithium niobate, lithium iodate, potassium niobate, monopotassium phosphate, and ammonium dihydrogen phosphate.

20. The apparatus of claim 11, wherein the receiver includes at least one of a polarization controller and a frequency controller.

* * * * *